US007017185B1

(12) United States Patent
Wiley et al.

(10) Patent No.: US 7,017,185 B1
(45) Date of Patent: Mar. 21, 2006

(54) METHOD AND SYSTEM FOR MAINTAINING NETWORK ACTIVITY DATA FOR INTRUSION DETECTION

(75) Inventors: Kevin L. Wiley, Elgin, TX (US);
 Gerald S. Lathem, Elgin, TX (US);
 Michael L. Hall, Jr., Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1035 days.

(21) Appl. No.: 09/746,305

(22) Filed: Dec. 21, 2000

(51) Int. Cl.
 *G06F 11/30* (2006.01)
 *G06F 17/30* (2006.01)
(52) U.S. Cl. .............................. 726/23; 709/224; 707/1
(58) Field of Classification Search ................ 713/150,
 713/168, 176, 200, 201; 709/223, 224; 707/1,
 707/3, 200, 201, 203
 See application file for complete search history.

(56) References Cited

U.S. PATENT DOCUMENTS

| | | | | |
|---|---|---|---|---|
| 5,850,516 A | * | 12/1998 | Schneier ..................... | 713/200 |
| 5,991,881 A | * | 11/1999 | Conklin et al. ............. | 713/201 |
| 6,072,942 A | | 6/2000 | Stockwell et al. ...... | 395/200.36 |
| 6,249,755 B1 | | 6/2001 | Yemini et al. .............. | 702/183 |
| 6,400,996 B1 | | 6/2002 | Hoffberg et al. ............. | 700/83 |
| 6,647,400 B1 | | 11/2003 | Moran ......................... | 707/205 |
| 6,671,818 B1 | | 12/2003 | Mikurak ....................... | 714/4 |
| 6,779,120 B1 | | 8/2004 | Valente et al. ............. | 713/201 |
| 6,826,697 B1 | | 11/2004 | Moran ......................... | 713/201 |

OTHER PUBLICATIONS

Gomez et al, "Complete Expression Trees for Evolving Fuzzy Classifier Systems with Genetic Algorithms and Application to Network Intrusion Detection", 2002, IEEE, pp 469-474.*
Chang et al, "Parsimonious Downgrading and Decision Tree Applied to the Inference Problem", Center for High Assurance Computer Systems, pp 1-8.*
Kumar, "Classification and Detection of Computer Intrusions", Aug. 1995, Thesis Submitted to the Faculty of Purdue University, pp 1-165.*

* cited by examiner

*Primary Examiner*—Christopher Revak
(74) *Attorney, Agent, or Firm*—Baker Botts L.L.P.

(57) ABSTRACT

A method and system for maintaining network activity data for intrusion detection includes storing data representative of network activity in datasets. The datasets include root datasets each having a root keyset and child datasets each having a child keyset with a key combination derived from and less granular than a root keyset. Child datasets are identified through their root datasets.

53 Claims, 4 Drawing Sheets

METHOD AND SYSTEM FOR MAINTAINING NETWORK ACTIVITY DATA FOR INTRUSION DETECTION

TECHNICAL FIELD OF THE INVENTION

This invention relates generally to the field of intrusion detection, and more particularly to a method and system for maintaining network activity data for intrusion detection.

BACKGROUND OF THE INVENTION

Computer networks have become an increasingly important means for communicating public and private information between and within distributed locations. The Internet is one example of a public network commonly used for communicating public and private information. Internet web servers provide access to public information such as news, business information and government information which the Internet makes readily available around the world. The Internet is also becoming a popular form for business transactions, including securities transactions and sales of goods and services.

A large number of people have come to depend upon reliable Internet access and secure communications on a day-by-day and even second-by-second basis. Like the Internet, private networks also have become a common means for communicating important information. Private networks such as company intranets, local area networks (LANs), and wide area networks (WANs), generally limit access on a user-by-user basis and communicate data over dedicated lines or by controlling access through passwords, encryption, or other security measures.

One danger to reliable and secure network communications is posed by hackers or other unauthorized users disrupting or interfering with network resources. The danger posed by unauthorized access to computer network resources can vary from simple embarrassment to substantial financial losses. For example, serious financial disruptions occur when hackers obtain financial account information or credit card information and use that information to misappropriate funds.

Intrusion detection systems are commonly used to detect and identify unauthorized use of a computer network before network resources and information are substantially disrupted or violated. In general, intrusion detection systems track address data for traffic on the network. This data is organized into keysets representing attack profiles and is continually updated and accessed to identify potential attacks on the network.

Current methods for retrieving intrusion detection data search the data for each keyset relevant to the traffic being monitored. In the case of Internet Protocol (IP) traffic, this means that each packet monitored on the network generates from four to six searches of the data, which is detrimental to the overall performance of the intrusion detection system.

SUMMARY OF THE INVENTION

The present invention provides a method and a system for maintaining network activity data for intrusion detection that substantially eliminate or reduce disadvantages and problems associated with previous methods and systems. In particular, the present invention indexes network activity data to allow intrusion detection to be performed using a reduced number of data searches.

In accordance with one embodiment of the present invention, a method and system for maintaining network activity data for an intrusion detection system includes storing data representative of network activity in datasets. The datasets include root datasets each having a root keyset and child datasets each having a child keyset with a key combination derived from and less granular than the root keyset. Child datasets are identified through their root datasets.

More specifically, in accordance with a particular embodiment of the present invention, all child datasets of a root dataset may be identified through the root dataset. In this and other embodiments, the child datasets may be identified by pointers from the root dataset to the child dataset. Root datasets may also identify a sibling root dataset with the sibling root dataset identifying all of its child datasets.

Technical advantages of the present invention include providing an improved method and system for maintaining network activity data for intrusion detection. In a particular embodiment, network activity is represented by datasets with each root dataset identifying its child datasets. The root and child datasets relevant to a particular item of network traffic are found and/or generated and then associated with each other upon the first occurrence of the network traffic. As a result, the number of searches is reduced with only one search being required upon the reoccurrence of the network traffic and/or an occurrence of related network traffic.

Another technical advantage of one or more embodiments of the present invention includes providing an improved intrusion detection system. In particular, the intrusion detection system can process traffic efficiently through a search reduction algorithm for queries into intrusion detection data that has a subset/superset relationship. As a result, the system can monitor additional traffic or an equal amount of traffic with reduced resources to efficiently detect attacks.

Still another technical advantage of one or more embodiments of the present invention includes providing an improved method and system for removing outdated data from an intrusion detection system. In particular, child datasets are linked with root datasets and allowed to expire only when they are no longer needed. Outdated datasets no longer in use are automatically eliminated. Accordingly, the amount of data that must be maintained by the system is reduced without degenerating the system.

Other technical advantages will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
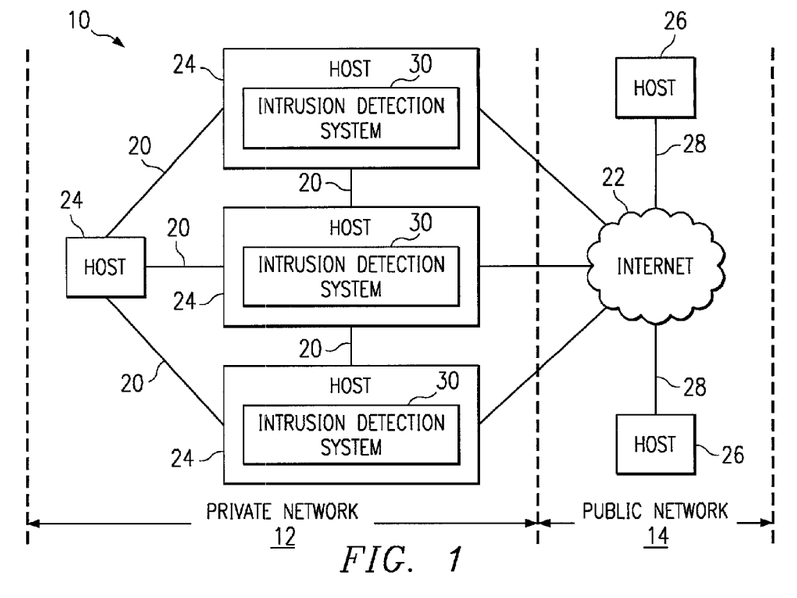
FIG. 1 is a block diagram illustrating a communications system in accordance with one embodiment of the present invention.

FIG. 1 illustrates a communications system 10 in accordance with one embodiment of the present invention. The communications system 10 is a packet switched network transmitting information in Internet Protocol (IP) or other suitable data packets. The information may be audio, video, voice, data and/or a combination of these or other suitable types of information.

Referring to FIG. 1, the communications system 10 includes a private network 12 and a public network 14. In the illustrated embodiment, the private network is an intranet 20 and the public network is the Internet 22. It will be understood that the private and public networks 12 and 14 may be other suitable types of networks.

The private network 12 includes a plurality of hosts 24 connected by an internal network of links 20. The network is a local area network (LAN), a wide area network (WAN), or other suitable connection of wireline or wireless links 20, capable of communicating data between the hosts 24. For the local area network embodiment, the network may be an Ethernet.

The public network 14 includes a plurality of hosts 26 connected to the Internet 22 by wireline or wireless links 28. Through the Internet 22, the host 26 may access one another and access the hosts 24 in the private network 12. In the IP embodiment, the hosts 24 and 26 each include an IP address uniquely identifying the host within its network.

The hosts 24 and 26 are each a computer such as a personal computer, file server, workstation, minicomputer, mainframe, or any general purpose or other computer or device capable of communicating with other computers or devices over a network. The hosts 24 and 26 include input/output (I/O) interfaces for communicating over the network, general purpose and/or application specific integrated circuit (ASIC), field programmable gate array (FPGA) or other suitable specific purpose processors, and memory for storing programs and other suitable operating instructions.

The hosts 24 operating on the border between the intranet 20 and the Internet 22 each include an intrusion detection system 30. As used herein, each means every one of at least a subset of the identified items. The intrusion detection system 30 tracks data based on source and destination relationships of the traffic to identify attacks on the private network 12. For the IP embodiment, the intrusion detection system 30 tracks relationships described by the source address, source port, destination address and destination port of the IP packets.

Figure 2:
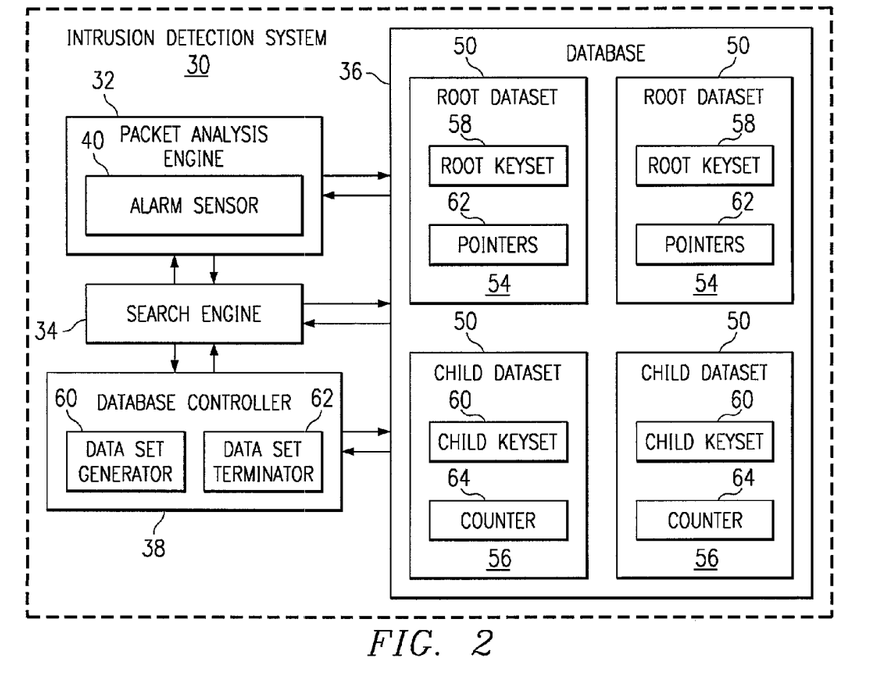
FIG. 2 is a block diagram illustrating details of the intrusion detection system in FIG. 1 in accordance with one embodiment of the present invention.

FIG. 2 illustrates details of the intrusion detection system 30 in accordance with one embodiment of the present invention. In this embodiment, the intrusion detection system monitors IP packets to identify attacks on a network. It will be understood that the intrusion detection system 30 may monitor other suitable types of packets and information on the network.

Referring to FIG. 2, the intrusion detection system 30 includes a packet analysis engine 32, a search engine 34, a database 36, and a database controller 38. The intrusion detection system 30, including the packet analysis engine 32, search engine 34, database 36 and database controller 38, comprise logic encoded in media. The logic comprises functional instructions for carrying out programmed tasks. The media comprises storage media such as computer disk or other suitable computer-readable media, application specific integrated circuits (ASIC), field programmable gate arrays (FPGA) or other suitable specific or general purpose processors, and other suitable storage media in which logic may be encoded and utilized. The media may also comprise transmission media The packet analysis engine 32 reads routing information, or packet data, from monitored packets processed by a host 24. In the IP embodiment, the packets are sent between the hosts 24 and 26 in the transmission control protocol/internet protocol (TCP/IP) format. In the TCP/IP format, the signatures identify the source and destination for the payload information contained in the packet. In particular, each IP packet contains a source IP address, a source port, a destination IP address and a destination port. The packet analysis engine 32 stores representations of this information which may include the information itself, in the database 36 and retrieves information about previous relevant network activity to process the signature.

The packet analysis engine 32 includes a sensor 40 that identifies attacks on host 24 within the private network 12. In particular, the sensor 40 processes each signature using network activity data retrieved in the database 36 to determine whether the signature may be part of an attack. When the sensor 40 identifies an attack, the intrusion detection system 30 notifies the host 24 which may inform a network operator of the attack, block traffic associated with the attack and/or take other suitable action.

The search engine 34 accesses the database 36 in response to requests by the packet analysis engine 32 to identify and/or retrieve network activity data associated with a signature processed by the packet analysis engine 32. In the IP embodiment, the search engine 34 searches the database 36 based on the source IP address, source port, destination IP address and destination port of the signature to identify the location of network activity data relevant to the signature. The location of the data or the data itself is passed to the packet analysis engine 32 for retrieval and/or processing of the data in connection with the signature.

The database 36 stores network activity data in datasets 50. In one embodiment, the database 36 includes a plurality of datasets 50 each including a keyset 52 and information indicative of network activity corresponding to the keyset 52. In the IP embodiment, the keysets include source IP address, source port, destination IP address and/or destination port key combinations.

The datasets 50 include root datasets 54 and child datasets 56. The root datasets 54 include root keysets 58 while the child datasets 56 include child keysets 60. The root and child keysets 58 and 60 have a superset/subset relationship with the child keysets 60 having a key combination derived from and less granular than the root keysets 58. In one embodiment, the root keysets 58 are stream based keysets identifying a specific connection. The child keysets are host-to-host and other keysets identifying part of a connection. Accordingly, each child keyset 60 includes a key combination derived from one or more root keysets 58. Two or more root datasets 50 may form sibling datasets 50 having root keysets 58 with reverse representations of a connection, and thus each other.

The root datasets 54 each identify relevant child datasets 56. Relevant child datasets 56 are datasets having child keysets 60 with a combination of keys derived from the root keyset 58 of the root dataset 54 and used by the packet analysis engine 32 to process signatures for intrusion detection. In a particular embodiment, the root datasets 54 include pointers from the root dataset 54 to each relevant child dataset 56. This allows data for the relevant child datasets 56 to be identified through the root datasets 54 and reduces the number of searches of the database 36 by the search engine 34. Accordingly, signatures are more efficiently processed by the packet analysis engine 32. It will be understood that child datasets 56 may be otherwise suitably identified by and/or through root datasets 54 to which they relate.

The database controller 38 controls generation and termination, or expiration, of datasets 50 in the database 36. In one embodiment, the database controller 38 includes a dataset generator 60 and a dataset terminator 62. The dataset generator 62 automatically generates datasets 50 absent from a database 36 and relevant to a signature processed by the packet analysis engine 32. In this embodiment, the dataset generator generates and manages the pointers. In a particular embodiment, the number of pointers maintained by or for any element is fixed in size and pointer management overhead is felt only during initial generation and/or association of a child dataset with a root dataset.

The dataset terminator 62 automatically terminates outdated datasets 50 including root datasets 54 at the end of a corresponding session and child datasets 56 no longer having any root datasets 54. In a particular embodiment, the child datasets 56 include a counter 64 indicating the number of root datasets 54 to which they correspond. Upon generation of a related dataset 54, the counter 64 is incremented by 1 and upon termination of a related root dataset 54, the counter 64 is decremented by 1 such that the counter is decremented to a value of zero upon all related root datasets 54 being terminated or being readied for termination from the database 36. The counter value is a termination status indicator with child datasets 56 having a value of zero being automatically deleted. Thus, outdated child datasets 56 are automatically removed from the database 36. It will be understood that data may be otherwise inserted into and/or removed from the database 36 without departing from the scope of the present invention.

Figure 3A:
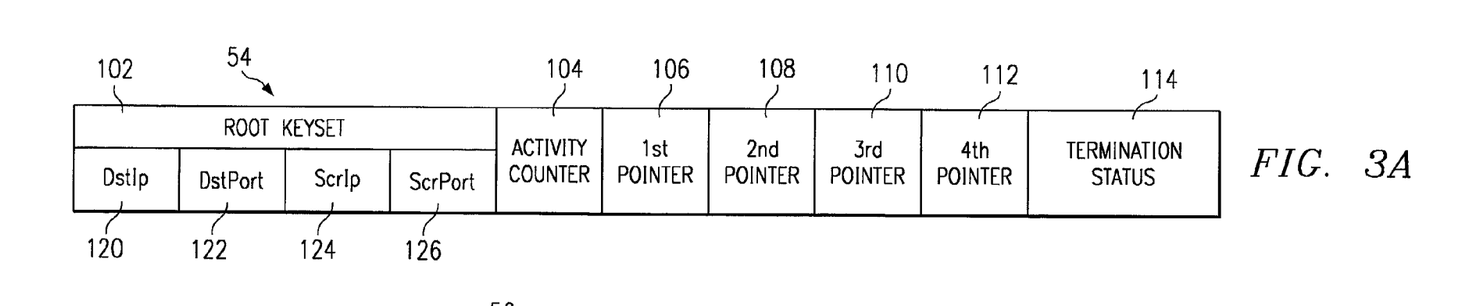
FIGS. 3A–B are block diagrams illustrating details of root and child datasets in the intrusion detection system of FIG. 2 in accordance with one embodiment of the present invention.
Figure 3B:
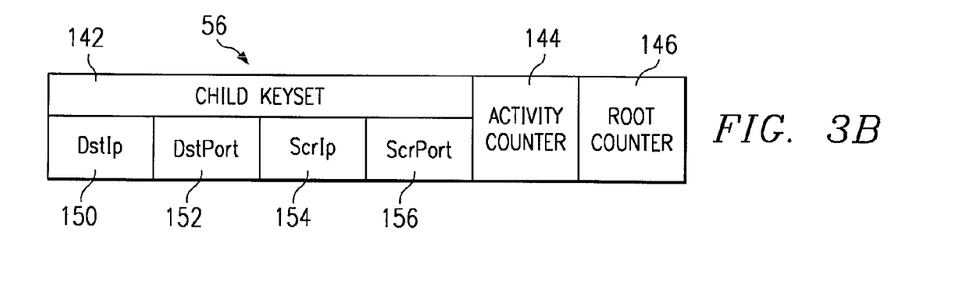

FIGS. 3A–B illustrate details of datasets 50 in accordance with one embodiment of the present invention. In particular, FIG. 3A illustrates details of a root dataset 54 and FIG. 3B illustrates details of a child dataset 56. The datasets 50 each comprise at least a keyset and data corresponding to the keyset. It will be understood that the root and child datasets 54 and 56 may comprise other or different data without departing from the scope of the present invention.

Referring to FIG. 3A, a root dataset 54 includes a root keyset 102, an activity counter 104, a first pointer 106, a second pointer 108, a third pointer 110, a fourth pointer 112 and a termination status 114. The root keyset 102 is a stream based, high granularity keyset identifying a specific connection and/or specifics of a connection. For the IP embodiment, the root keyset 102 includes a destination IP address 120, a destination port address 122, a source IP address 124 and a source port 126. Accordingly, the root keyset 102 identifies a connection between specific hosts 24 and 26 and ports of the hosts 24 and 26.

The activity counter 104 includes a counter or other suitable indication of a number of occurrences of traffic corresponding to the root keyset 102. The activity counter 104 is incremented each time traffic corresponding to the root keyset is received and decremented as the data is aged and/or reset after a particular session, in which case attacks are identified on a session-by-session basis. The value of the activity counter 104 is used by the sensor 40 to determine whether an activity threshold has been exceeded and an attack is or may be underway.

The pointers 106, 108, 110 and 112 point from the root dataset 54 to child datasets 56 and to sibling root datasets having a reverse root keyset 102. Accordingly, data for the child datasets 56 and sibling datasets are identified by the root dataset 54.

The termination status 114 indicates whether the root dataset 54 can be terminated. In one embodiment, the root dataset 54 is only terminated when both it and its sibling root dataset are outdated. In this embodiment, the root and sibling datasets may be outdated at the end of a session to which they correspond or when the activity counter 104 indicates that the datasets are empty. Thus, sibling datasets are only terminated when they are as a group outdated and no longer in use.

Referring to FIG. 3B, child dataset 56 includes a child keyset 142, an activity counter 144, and a root counter 146. The child keyset 142 includes a subset of the root keyset 102. In the IP embodiment, the child keyset includes one, two or three of the destination IP address 150, destination port 152, source IP address 154, and source port 156. Accordingly, the child keyset 142 is a subset of the root keyset 102 and is derived from and less granular than the root keyset 102 and may apply to a plurality of connections. The child dataset 56 is relevant to one or more root datasets 54.

The activity counter 144 includes a counter or other suitable indication of a number of occurrences of traffic corresponding to the child keyset 142. As discussed in connection with activity counter 104, the value of the activity counter 144 is incremented and decremented, aged or reset and is used by the sensor 40 to determine whether an activity threshold has been exceeded and an attack is underway.

The root counter 146 identifies a number of root datasets 54 to which a child dataset 56 is relevant. This number is incremented each time a root dataset 54 relevant to the child dataset 56 is added to the database 36 and decremented each time a root dataset 54 relevant to the child dataset 56 is removed from the database 36. Thus, the child dataset 56 is internally aware of a number of root datasets 54 to which it relates. Upon termination of all relevant root datasets 54, the root counter 146 is decremented to zero, indicating that the child dataset 56 is no longer needed and can be automatically deleted from the database 36. In this way, outdated datasets are automatically removed from the database 36.

Figure 4:
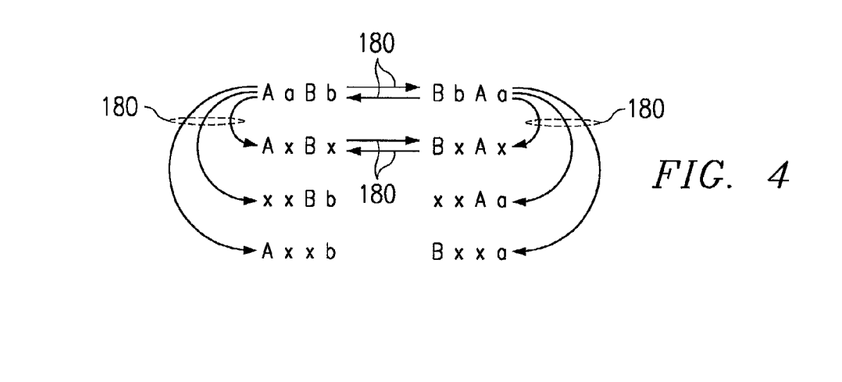
FIG. 4 is a diagram illustrating associations between root and child datasets in the intrusion detection system of FIG. 2 in accordance with one embodiment of the present invention.

FIG. 4 illustrates a family of related datasets 50 and indexing and/or association of the datasets 50 in accordance with one embodiment of the present invention. The datasets allow network activity data to be sorted into data groups corresponding to attack profiles. The methodology of attacks are defined based on the attacker/targeter relationship. Some attacks originate from a single host targeting a single host, creating a one-to-one or host-to-host type of relationship. Some attacks originate from a single host targeting many hosts, creating a one-to-many relationship. Some attacks require that a full TCP connection be in place from the attacker to the target, creating a stream based relationship.

With each type of different attack, however, source and/or destination information contained within the packets describe the relationship of interest.

Referring to FIG. 4, the traffic activity data is collected in the TCP/IP quad format from address information in the header of IP packets. In particular, the IP header includes a source IP address, a source port, a destination IP address and a destination port of the IP packet. A connection from a specific source IP address "A" and a specific source port "a" to a specific destination IP address "B" and specific destination port "b" is represented by a keyset of "AaBb."

Keyset "AaBb" is a root keyset 58 having child keysets 60 "AxBx," "xxBb," and "Axxb," where "x" denotes an open key not specifying information. To identify datasets 56 for the child keysets 60, the dataset 54 for the root keyset "AaBb" includes pointers 180 from the root dataset 54 to each of the child datasets 56 containing the keysets 60.

The root datasets 54 for keyset "AaBb" also includes a pointer to its sibling dataset 54 having a root keyset 58 with a reverse representation "BbAa." Similar to the root dataset 54 for keyset "AaBb," the sibling dataset 54 for root keyset "BbAa" includes pointers to child datasets 56 with child keysets "BxAx," "xxAa," and "Bxxa." In a particular embodiment, host-to-host child keysets "AxBx" and "BxAx" include pointers to one another to facilitate identification.

Sorting of network activity data into the root and child keysets allows different types of intrusion attacks to be recognized by the intrusion detection system 30. For example, in a web-based attack, the attacker passes through a specific web application. Accordingly, these types of attacks will have the same stream based information and are detectable through data tracked in connection with the root keysets "AaBb" and "BbAa."

For straight machine attacks, one machine attacks or attempts to hack into another machine. In this type of attack, the source and destination addresses will stay the same, but the source and destination ports may vary. Accordingly, these types of attacks are identifiable by data tracking in connection with child keysets "AxBx" and "BxAx." For multiple-host attacks, the attaching host will vary while the attack host and application remain the same. Child keysets "xxBb" and "xxAa" will detect this type of attack. Child keysets "Axxb" and "Bxxa" will detect attacks from a specific host to a specific network port. By indexing data for the keysets based on their superset/subset relationship, all data relevant to processing a signature for intrusion detection can be retrieved from the database 36 from a single or reduced number of searches. Thus, a signature can be evaluated for all tracked attack profiles based on a single search of the database 36.

Figure 5:
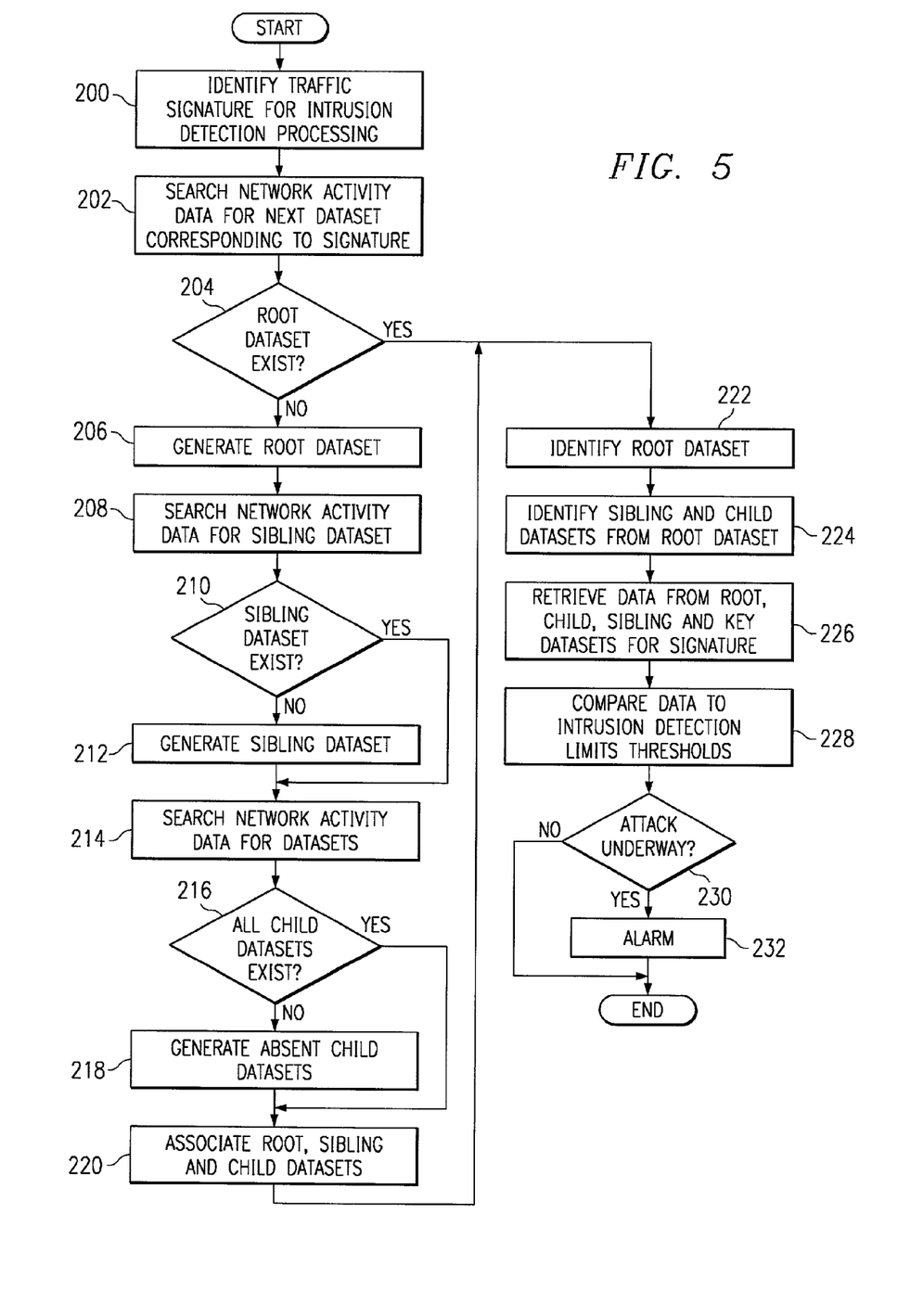
FIG. 5 is a flow diagram illustrating a method for retrieving network activity data for intrusion detection in accordance with one embodiment of the present invention.

FIG. 5 is a flow diagram illustrating a method for retrieving network activity data for signature processing within an intrusion detection system in accordance with one embodiment of the present invention. The method begins at step 200 in which a traffic signature for intrusion detection processing is identified. The signature may be identified by the packet analysis engine 32 and then passed to the search engine 34 for processing. For the IP embodiment, the signature comprises a source IP address, source port, destination IP address and destination port.

Proceeding to step 202, the database 36 containing network activity data is searched for a root keyset 58 and/or a root dataset 54 containing the root keyset 58 corresponding to the signature. For the IP embodiment, the root keyset 58 comprises the source IP address, source port, destination IP address and destination port. Next, at decisional step 204, the search engine 34 determines whether a root dataset 54 for the root keyset 58 exists in the database 36. If the root keyset 58 does not exist, the No branch of decisional step 204 leads to step 206.

At step 206, the root dataset 54 including the root keyset 58 is generated by the database controller 38. At step 208, the search engine 34 searches the network activity data in the database 36 for a sibling keyset 58 and/or a root dataset 54 containing the sibling keyset 58 having a reverse representation from the root keyset 58.

At decisional step 210, the search engine 34 determines whether the sibling keyset 58 exists. If the sibling keyset 58 does not exist, the No branch of decisional step 210 leads to step 212. At step 212, the database controller 38 generates a root dataset 54 including the sibling keyset 58. Step 212 leads to step 214. Returning to decisional step 210, if the sibling keyset 58 exist in the database 36, the Yes branch of decisional step 210 also leads to step 214.

At step 214, the search engine 34 searches network activity data in the database 36 for child keysets 60 and/or child datasets 56 containing child keysets 60. Next, a decisional step 216, the search engine 34 determines whether all relevant child keysets 60 exist in the database 36 for the root keyset 58. If all child keysets 60 do not exist, the No branch of decisional step 216 leads to step 218 in which child datasets 56 including the absent child keysets 60 are generated. Step 218 leads to step 220. Returning to decisional step 216, if all child keysets 60 exist, the Yes branch of decisional step 216 also leads to step 220. Thus, all sibling and child datasets 54 and 56 with keysets relevant to a root keyset 58 are identified and/or generated upon the generation of the root dataset 54.

At step 220, the root, sibling and child keysets 58 and 60 are associated with each other through their datasets 54 and 56 to allow the sibling and child keysets 58 and 60 to be identified through the dataset 54 for the root keyset 58. In one embodiment, the root, sibling and child keysets 58 and 60 are associated with each another by storing pointers with the root dataset 54 to each of the child and sibling datasets 54 and 56. Accordingly, using the root dataset 54, all network activity data relevant to a signature may be identified and retrieved from the database 36.

Returning to decisional step 204, if the root keyset 58 exists, then all relevant sibling and child datasets 54 and 56 exist and have been previously associated with the root dataset. Accordingly, the Yes branch of decisional step 204, as well as step 220, lead to step 222 in which the root dataset 54 is identified. Next, at step 224, sibling and child datasets 54 and 56 relevant to the signature are identified from the root dataset 54.

At step 226, network activity data is retrieved from the root, sibling and child datasets 54 and 56 for processing of the signature. At step 228, the retrieved data is compared to intrusion detection thresholds by the sensor 40. At decisional step 230, the sensor 40 determines whether an attack is or may be underway. An attack may be underway if network activity data associated with the signature exceeds predefined thresholds. In this event, the Yes branch of decisional step 230 leads to step 232 in which an alarm is generated to notify a network operator of the attack or to block the attack. Step 232 leads to the end of the process.

Returning to decisional step 230, if no attack is detected, the No branch of decisional step 230 also leads to the end of the process. Thus, network activity data used to process a signature for intrusion detection is retrieved from a database with a single database search. As a result, the intrusion detection system 30 can process traffic faster and/or with reduced resources through more efficient searches.

Figure 6:
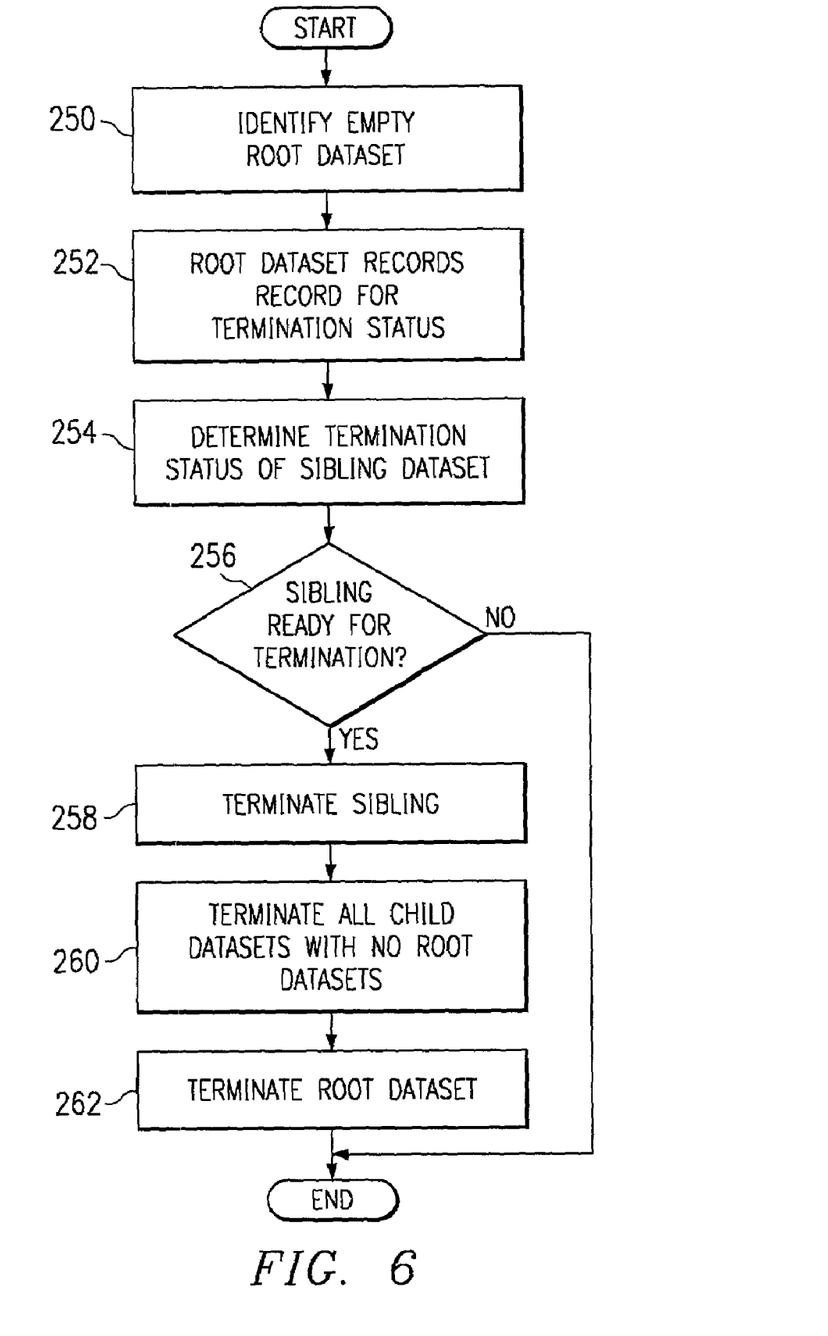
FIG. 6 is a flow diagram illustrating a method for removing outdated datasets from the intrusion detection system of FIG. 2 in accordance with one embodiment of the present invention.

FIG. 6 illustrates a method for removing outdated network activity data in accordance with one embodiment of the present invention. The method begins at step 250 in which a root dataset 54 is identified as outdated by the database controller 38. The root dataset 54 may be identified as outdated at the end of a corresponding session or upon any other suitable event. Next, at step 252, the root dataset 54 records that it is ready for termination in its termination status 114.

Proceeding to step 254, the database controller 38 determines a termination status of the sibling dataset 54 from its termination status 114. Next, at decisional step 256, the dataset terminator 62 for the database controller 38 determines whether the sibling is ready for termination based on the termination status 114. The sibling dataset is ready for termination if its termination status 114 indicates that it is ready for termination and not ready for termination if its termination status 114 indicates that it is not ready for termination.

At the decisional step 256, if the sibling dataset 54 is not ready for termination, then the root dataset 54 is maintained for signature processing in connection with the sibling dataset 54 and the No branch of decisional step 256 leads to the end of the process. If the sibling is ready for termination, then the root and sibling datasets 54 may be terminated and the Yes branch of decisional step 256 leads to step 258 in which the sibling dataset 54 is terminated. Child datasets 56 for the sibling dataset 54 are terminated as described below in connection with the root dataset 54.

Next, at step 260, all child datasets 56 related to the root dataset 54 and having no other root datasets are terminated. In one embodiment, the child datasets 56 each include the root counter 146 indicating the number of relevant root datasets in the database 36. Each time a root dataset 54 is terminated, the counter for all relevant child datasets 56 is decremented such that the counter is zeroed out or reaches another suitable predefined value to indicate that the child dataset 56 is no longer needed. In this embodiment, all child datasets 56 having a root counter value of zero are automatically deleted from the database 36. It will be understood that the child datasets 56 may be otherwise suitably deleted from the database 36 without departing from the scope of the present invention.

Next, at step 262, the root dataset 54 is terminated from the database 56. Thus, the root, sibling and all child datasets 56 relevant only to the root dataset 54 are deleted from the database 36 at the end of the corresponding data session or when otherwise outdated. Step 262 leads to the end of the process by which unneeded datasets 50 are automatically deleted to minimize the amount of data that must be searched and the cost of maintaining intrusion detection data.

Although the present invention has been described with several embodiments, various changes and modifications may be suggested to one skilled in the art. It is intended that the present invention encompass such changes and modifications as fall within the scope of the appended claims.

What is claimed is:

1. A method for maintaining network activity data for an intrusion detection system, comprising:
   storing data representative of network activity in datasets, the datasets including root datasets each having a root keyset and child datasets each having a child keyset with a key combination being a subset of, and less granular than, a root keyset; and
   identifying a child dataset of a root dataset through the root dataset.

2. The method of claim 1, further comprising identifying a plurality of child datasets of the root dataset through the root dataset.

3. The method of claim 1, further comprising identifying all child datasets of the root dataset through the root dataset.

4. The method of claim 1, further comprising identifying the child dataset of the root dataset with a pointer from the root dataset to the child dataset.

5. The method of claim 1, further comprising identifying all child datasets through their root datasets.

6. The method of claim 1, wherein each root dataset comprises a plurality of child datasets.

7. The method of claim 1, wherein the root dataset includes a sibling root dataset, the sibling root dataset and the root dataset having root keysets a reverse of each other, further comprising identifying the sibling root dataset through the root dataset.

8. The method of claim 7, wherein the root dataset and the sibling root dataset collectively identify all of their child datasets and identify one another.

9. The method of claim 1, wherein the root keysets each comprise a source address key and a destination address key.

10. The method of claim 1, wherein the root keysets comprise quad keysets.

11. The method of claim 10, wherein the quad keysets each comprise a source address key, a source port key, a destination address key and a destination port key.

12. The method of claim 1, wherein the child keysets comprise one of single, dual and triple keysets.

13. The method of claim 1, wherein the root keysets comprise stream based keysets.

14. The method of claim 13, wherein the stream based keysets comprise a source address key, a source port key, a destination address key and a destination port key, a first child keyset comprises a source address key and a destination address key, a second child keyset comprises a destination address key and a destination port key, and a third child keyset comprises a source address key and a destination port key.

15. The method of claim 1, wherein the datasets comprise data buckets.

16. The method of claim 1, further comprising identifying all child datasets of the root dataset through the root dataset with a single search of a database storing the datasets.

17. The method of claim 1, further comprising:
   receiving a traffic signature not having a root dataset;
   generating a root dataset having a root keyset representative of the traffic signature;
   identifying all existing child and sibling root datasets of the root dataset;
   generating all absent child and sibling root datasets of the root dataset; and
   associating the child and sibling root datasets with the root dataset.

18. The method of claim 1, further comprising automatically removing outdated root datasets and child datasets.

19. The method of claim 18, further comprising storing a counter for each child dataset, the counter operable to indicate an outdated status of the child dataset.

20. The method of claim 1, further comprising retrieving data for processing a traffic signature by searching a data storage system including the datasets for an existing root dataset having a root keyset corresponding to the traffic signature and identifying all child datasets, sibling root datasets, and child datasets of the sibling root datasets through the root dataset.

21. An intrusion detection system, comprising:
   logic encoded in computer-readable media; and
   the logic operable to store data representative of network activity in datasets, the datasets including root datasets each having a root keyset and child datasets each having a child keyset with a key combination being a subset of, and less granular than, a root keyset and further operable to identify a child dataset for a root dataset through the root dataset.

22. The intrusion detection system of claim 21, the logic further operable to identify a plurality of child datasets of the root dataset through the root dataset.

23. The intrusion detection system of claim 21, the logic further operable to identify all child datasets of the root dataset through the root dataset.

24. The intrusion detection system of claim 21, the logic further operable to identify the child dataset of the root dataset with a pointer from the root dataset to the child dataset.

25. The intrusion detection system of claim 21, the logic further operable to identify all child datasets through their root datasets.

26. The intrusion detection system of claim 21, wherein each root dataset comprises a plurality of child datasets.

27. The intrusion detection system of claim 21, wherein the root dataset includes a sibling root dataset, the root dataset and the sibling root dataset having root keysets a reverse of each other, the logic further operable to identify the sibling root dataset through the root dataset.

28. The intrusion detection system of claim 27, wherein the root dataset and the sibling root dataset collectively identify all of their child datasets and identify one another.

29. The intrusion detection system of claim 21, wherein the root keysets each comprise a source address key and a destination address key.

30. The intrusion detection system of claim 21, wherein the root keysets comprise quad keysets.

31. The intrusion detection system of claim 30, wherein the root keysets comprise quad keysets, the quad keysets each including a source address key, a source port key, a destination address key, and a destination port key.

32. The intrusion detection system of claim 21, wherein the child keysets comprise one of single, dual and triple keysets.

33. The intrusion detection system of claim 21, wherein the root keysets comprise stream based keysets.

34. The intrusion detection system of claim 21, the logic further operable to receive a traffic signature not having a root dataset, to generate a root dataset having a root keyset representative of the traffic signature, to identify all existing child and sibling root datasets of the root dataset, to generate absent child and sibling root datasets of the root dataset and to associate the child and sibling root datasets of the root dataset with the root dataset.

35. The intrusion detection system of claim 21, wherein the datasets comprise data buckets.

36. The intrusion detection system of claim 21, the logic further operable to automatically remove outdated root and child datasets.

37. The intrusion detection system of claim 36, the logic further operable to maintain a counter for each child dataset, the counter operable to indicate an outdated status of the child dataset.

38. The intrusion detection system of claim 21, the logic further operable to retrieve data for processing of a traffic signature by searching a data storage system including the datasets for an existing root dataset corresponding to the traffic signature and to identify all child datasets, sibling root datasets and child datasets of the root dataset and the sibling root dataset through the root dataset.

39. A system for maintaining data on network activity for an intrusion detection system, comprising:
   means for storing data representative of network activity in datasets, the datasets including root datasets each having a root keyset and child datasets each having a child keyset with a key combination being a subset of, and less granular than, a root keyset; and
   means for identifying a child dataset of a root dataset through the root dataset.

40. The system of claim 39, further comprising means for identifying the child dataset of the root dataset with a pointer from the root dataset to the child dataset.

41. The system of claim 39, further comprising means for identifying all child datasets of the root dataset through the root dataset.

42. The system of claim 39, further comprising means for identifying all child datasets through their root datasets.

43. The system of claim 39, wherein the root datasets include a sibling root dataset, the sibling root dataset and the root dataset having root keysets a reverse of each other, further comprising means for identifying the root dataset and the sibling root dataset through each other.

44. The system of claim 39, further comprising:
   means for receiving a traffic signature not having a root dataset;
   means for generating a root dataset having a root keyset representative of the traffic signature;
   means for identifying all existing child and sibling root datasets of the root dataset;
   means for generating absent child and sibling root datasets of the root dataset; and
   means for associating the child and sibling root datasets of the root dataset with the root dataset.

45. The system of claim 39, further comprising means for automatically removing outdated root datasets and child datasets.

46. The system of claim 39, further comprising:
   means for retrieving data for processing of a traffic signature by searching a data storage system for an existing root dataset having a root keyset corresponding to the traffic signature; and
   means for identifying all child datasets, sibling root datasets, and child datasets of the root dataset through the root dataset.

47. A method for maintaining data on Internet Protocol (IP) traffic for an intrusion detection system, comprising:
   storing data representative of network activity in datasets, the datasets including root datasets each having a quad keyset comprising a source address key, a source port key, a destination address key and a destination port key and child datasets each having a dual keyset with a key combination derived from and less granular than a quad keyset of a root dataset;
   storing pointers for each root dataset, the pointers each identifying a child dataset having a dual keyset derived from the quad keyset of the root dataset and a sibling root dataset having a quad keyset a reverse of the quad keyset of the root dataset; and
   retrieving data for processing of a traffic signature by performing a single search for a root dataset having a quad keyset corresponding to the traffic signature and identifying relevant child and sibling root datasets through the pointers of the root dataset.

48. The method of claim 47, wherein the dual keysets include a first dual keyset comprising a source address key and a destination address key, a second dual keyset comprising a destination address key and a destination port key, and a third dual keyset comprising a source address key and a destination port key.

49. A method for maintaining network activity data for an intrusion detection system, comprising:
   storing data representative of network activity in datasets, the datasets including root datasets each having a root keyset and child datasets each having a child keyset with a key combination derived from and less granular than a root keyset;
   identifying a child dataset of a root dataset through the root dataset;
   receiving a traffic signature not having a root dataset;
   generating a root dataset having a root keyset representative of the traffic signature;
   identifying all existing child and sibling root datasets of the root dataset;
   generating all absent child and sibling root datasets of the root dataset; and
   associating the child and sibling root datasets with the root dataset.

50. A method for maintaining network activity data for an intrusion detection system, comprising:
   storing data representative of network activity in datasets, the datasets including root datasets each having a root keyset and child datasets each having a child keyset with a key combination derived from and less granular than a root keyset;
   identifying a child dataset of a root dataset through the root dataset; and
   retrieving data for processing a traffic signature by searching a data storage system including the datasets for an existing root dataset having a root keyset corresponding to the traffic signature and identifying all child datasets, sibling root datasets, and child datasets of the sibling root datasets through the root dataset.

51. An intrusion detection system, comprising:
   logic encoded in computer-readable media;
   the logic operable to store data representative of network activity in datasets, the datasets including root datasets each having a root keyset and child datasets each having a child keyset with a key combination derived from and less granular than a root keyset and further operable to identify a child dataset for a root dataset through the root dataset; and
   the logic further operable to retrieve data for processing of a traffic signature by searching a data storage system including the datasets for an existing root dataset corresponding to the traffic signature and to identify all child datasets, sibling root datasets and child datasets of the root dataset and the sibling root dataset through the root dataset.

52. A system for maintaining data on network activity for an intrusion detection system, comprising:
   means for storing data representative of network activity in datasets, the datasets including root datasets each having a root keyset and child datasets each having a child keyset with a key combination derived from and less granular than a root keyset;
   means for identifying a child dataset of a root dataset through the root dataset;
   means for receiving a traffic signature not having a root dataset;
   means for generating a root dataset having a root keyset representative of the traffic signature;
   means for identifying all existing child and sibling root datasets of the root dataset;
   means for generating absent child and sibling root datasets of the root dataset; and
   means for associating the child and sibling root datasets of the root dataset with the root dataset.

53. A system for maintaining data on network activity for an intrusion detection system, comprising:
   means for storing data representative of network activity in datasets, the datasets including root datasets each having a root keyset and child datasets each having a child keyset with a key combination derived from and less granular than a root keyset;
   means for identifying a child dataset of a root dataset through the root dataset;
   means for retrieving data for processing of a traffic signature by searching a data storage system for an existing root dataset having a root keyset corresponding to the traffic signature; and
   means for identifying all child datasets, sibling root datasets, and child datasets of the root dataset through the root dataset.

* * * * *